United States Patent [19]

Maeda et al.

[11] Patent Number: 4,457,694
[45] Date of Patent: Jul. 3, 1984

[54] AUTOMATIC AIR-FUEL RATIO CONTROL APPARATUS

[75] Inventors: Yasunori Maeda; Kiroshi Nakagaki, both of Nara, Japan

[73] Assignee: Chugai Ro Kogyo Co., Ltd., Osaka, Japan

[21] Appl. No.: 364,214

[22] Filed: Apr. 1, 1982

[30] Foreign Application Priority Data

Apr. 4, 1981 [JP] Japan .................. 56-50966

[51] Int. Cl.³ ............................ F23N 1/02
[52] U.S. Cl. ........................ 431/90; 431/12; 236/80 R; 236/92 A
[58] Field of Search ............ 431/12, 90; 236/80 R, 236/92 A

[56] References Cited

U.S. PATENT DOCUMENTS 3,165,399  1/1965  Kennedy .................. 431/90
3,666,393  5/1972  Davies .................... 431/90

FOREIGN PATENT DOCUMENTS 2547075  3/1977  Fed. Rep. of Germany ........ 431/12
53-41831  4/1978  Japan .

Primary Examiner—Lee E. Barrett
Attorney, Agent, or Firm—Jackson, Jones & Price

[57] ABSTRACT

An automatic air-fuel ratio control apparatus for use in a combustion system of a type in which combustion air is preheated, which is so arranged that a push rod depresses one end portion of a rocking lever in accordance with temperature of preheated combustion air and consequently the other end portion of the rocking lever depresses a valve member to correct pressure of working fluid for controlling a flow of fuel so as to obtain best air-fuel ratio, and further that a bearing member for pivotally supporting the rocking lever can be diagonally shifted to change the air-fuel ratio.

6 Claims, 5 Drawing Figures

AUTOMATIC AIR-FUEL RATIO CONTROL APPARATUS

BACKGROUND OF THE INVENTION

The present invention relates to an automatic air-fuel ratio control apparatus for use in a combustion system of a type in which combustion air is preheated, in a heat exchanger, by exhaust gas at a high temperature in order to improve the thermal efficiency of the system.

Commonly, in a combustion system of a type in which combustion air and fuel are respectively supplied under a constant pressure, the flow control for the preheated combustion air and the fuel is accomplished by adjusting corresponding values so as to obtain the best air-fuel ratio for thermal efficiency. The best air-fuel ratio for thermal efficiency is approximately in the range of 1.1 to 1.2, depending on a type of burner and a type of fuel.

Meanwhile, the temperature of the preheated combustion air is not constant during operation, because the flow rate of the combustion air is variably controlled on the basis of the desired operation of the combustion system and consequently the temperature of the exhaust gas varies, so that the density of the combustion air changes. Accordingly, even if the opening of the air flow control valve of the burner remains constant so as to keep a constant volume of the combustion air flow, the mass of the combustion air flow varies in accordance with the temperature variation of the combustion air. The mass of the combustion air flow Q is expressed by the following formula:

$$Q = \sqrt{\alpha_o} \times V$$

$$\alpha_o = K_o/K$$

wherein
V : volume of combustion air flow,
Ko: standard absolute temperature,
K : actual absolute temperature.

Accordingly, under the condition that the volume of the combustion air flow is constantly controlled, the air-fuel ratio varies in accordance with the temperature of the combustion air. For instance, when the temperature of the combustion air changes from 20° C. to 250° C., the air-fuel ratio consequently changes from 1.1 to 0.75. As a result, in spite of the fact that the combustion air is preheated for the purpose of improvement of the thermal efficiency, it causes the deterioration of the thermal efficiency or inoperation of the combustion system and further creates a pollution nuisance.

In order to avoid such problems, commonly there has been provided an automatic air-fuel ratio control apparatus which constantly controls the air-fuel ratio after measuring the flow of the preheated combustion air flow in consideration of the temperature thereof.

The conventional air-fuel ratio control apparatus, however, has such a drawback that it needs expensive metering instruments such as a flowmeter for measuring the flow of the combustion air, a calculator for calculating the corresponding proper flow of combustion air in accordance with the temperature of the combustion air at every time, etc.

Conventionally, there has been provided an inexpensive air-fuel ratio control apparatus, for example, in Japanese Laid Open Patent Application Kokai No. 53-41831. This type of air-fuel ratio control apparatus, however, has an oversized and complicated configuration and, also requires a complicated operation for changing the air-fuel ratio, since it is directly incorporated in a fuel supply conduit.

SUMMARY OF THE INVENTION

Accordingly, an essential object of the present invention is to provide an automatic air-fuel control apparatus for use, in a combustion system of a type in which the combustion air is preheated, which is of a simple construction and can be readily operated not only to keep the air-fuel ratio at a constant level, but also to change the air-fuel ratio.

Another important object of the present invention is to provide an automatic air-fuel control apparatus of the above described type which is stable in functioning, has a high reliability, and can be readily incorporated into the combustion systems at a low cost.

In accomplishing these and other objects, according to one preferred embodiment of the present invention, there is provided an automatic air-fuel ratio control apparatus for use, in a combustion system of a type in which the combustion air is preheated, which comprises a housing for accommodating a rocking lever, a lever driving means for rocking the rocking lever in accordance with a temperature of the preheated combustion air, a pressure control valve which is driven by the rocking lever in such a manner that the valve corrects the pressure of working fluid for controlling the flow of fuel to obtain a desired air-fuel ratio and, an adjustment means for adjusting the position of said rocking lever. The lever driving means has a push rod which is mounted on the housing in such a manner that it may protrude into said housing during a stroke to push one end portion of the rocking lever in accordance with the temperature of the preheated combustion air. The pressure control valve has a valve member which is mounted on the housing in such a manner that it may be shifted by the opposite end portion of the rocking lever so that the pressure of the working fluid can be corrected. The adjustment means has a plane slanting with respect to a perpendicular plane to a shifting direction of the push rod and the pressure control valve and, a bearing member which pivotally supports said rocking lever and is slidably arranged on said slanting plane so that the relative protruding stroke of said Push rod with respect to one end portion of the lever may change and also the proportion of a length between the axis of the push rod and the pivot portion of said lever and a length between the axis of the valve member and the pivot portion may change according to a desired air-fuel ratio.

BRIEF DESCRIPTION OF THE DRAWINGS

These and other objects and features of the present invention will become apparent from the following description taken in conjunction with a preferred embodiment thereof with reference to the accompanying drawings, in which.

Before the description of the present invention proceeds, it is noted that like parts are designated by like reference numerals throughout the views of the accompanying drawings.

DETAILED DESCRIPTION OF THE INVENTION

Figure 1:
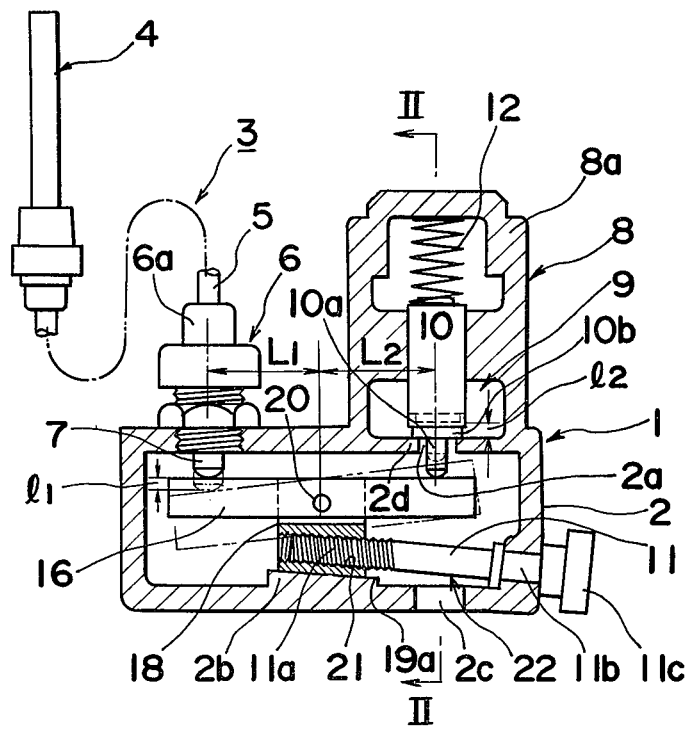
FIG. 1 is a cross sectional view of an automatic air-fuel ratio control apparatus according to one preferred embodiment of the present invention.
Figure 2:
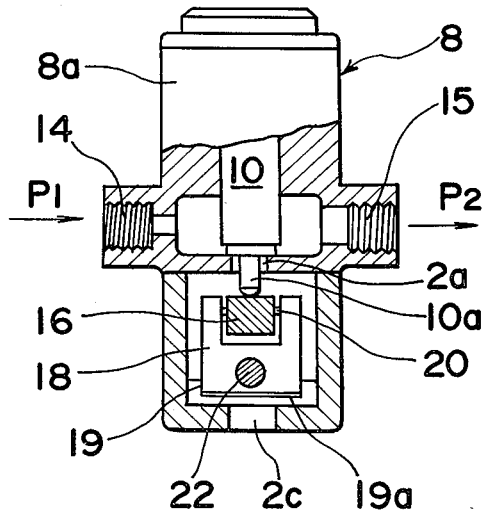
FIG. 2 is a cross sectional view taken along the line II—II in FIG. 1.

Referring to FIGS. 1 and 2, the air-fuel ratio control apparatus 1 according to the present invention comprises a housing 2 for accommodating a rocking lever 16, a lever driving device 3 for rocking the lever 16 in accordance with temperature of the preheated combustion air, a pressure control valve which is driven by the lever 16 so as to correct the pressure of working fluid supplied thereto to control a fuel pressure control valve and an adjustment device 22 for adjusting the position of the rocking lever 16.

The lever driving device 3 comprises a temperature sensor 4, to be mounted in a preheated combustion air supplying conduit, in which expansible fluid such as mercury is contained, a working member 6 which is fixed on an upper plane of the housing 2 and which works in accordance with the expansion of the expansible fluid in the temperature sensor 4 and, a conduit 5 for the expansible fluid which connects the temperature sensor 4 and the working member 6. The expansible fluid is also positioned in the conduit 5 and the working member 6.

The working member 6 has a push rod 7 which is slidably inserted in the body 6a thereof, with the lower end thereof protruding into the housing 2 and contacting the left end portion of the lever 16, when viewed in Fig. 1, from above. The push rod 7 is positioned by the pressure of the expansible fluid in the temperature sensor 4, the conduit 5 and the body 6a. In other words, when the temperature of the preheated combustion air rises, the expansible fluid in the temperature sensor 4 expands in accordance with the rising temperature so that the push rod 7 is lowered to push downwards the left end portion of the lever 16.

The pressure control valve 8 has a valve housing 8a thereof which is positioned on the upper plane of the housing 2 in a spaced relationship with respect to the body 6 of the lever driving device 6a. The housing 8a shown in FIGS. 1 and 2 is attached to the housing 2. In the valve housing 8a, there is provided a valve member 10 which is slidably mounted and a compression spring 12 for compressing the valve member 10 downwards. The valve member 10 has a protruding portion 10a at the lower part thereof which extends downwards into the housing 2 through an aperture 2a of the upper plane thereof and contacts the right end portion of the lever 16, when viewed in FIG. 1. The peripheral portion 2d around the aperture 2a forms a valve seat which cooperates with the shoulder portion 10b of the valve member 10. The valve member 10 is positioned by the lever 16. In other words, when the left portion of the lever 16 is depressed by the rod 7, the lever 16 rotates in the counterclockwise direction around the pivot pin 20, and consequently the valve member 10 is depressed upwards to open the aperture 2a larger. As shown in FIG. 2, the valve housing 8a is provided with an inlet 14 and an outlet 15 at the opposite sides of the valve member 10. The working fluid having a pressure P1 is supplied into a pressure controlling chamber 9 (FIG. 1) the valve housing 8a through the inlet 14 and is discharged to the fuel pressure control valve 31 (see FIG. 4) from the valve housing 8a through the outlet 15. The pressure P1 of the working fluid is the same as that for supplying the combustion air to the burner. When the aperture 2a is opened, the working fluid supplied into the valve housing 8a partially flows into the housing 2 through the aperture 2a in accordance with the opening degree of the aperture 2a and subsequently flows outwards from the housing 2 through an aperture 2c of the bottom plane thereof, so that the pressure P2 of the discharged working fluid decreases in accordance with the amount of the working fluid which flows outwards from the housing 2.

The adjustment device 22 comprises a bearing member 18 which pivotally supports the center portion of the lever 16, with respect to the longitudinal direction thereof, via a pin 20 and, a bolt 11 for adjusting the position of the lever 16. The bearing member 18 is slidably arranged in a channel 19 of a raised portion 2b which is formed on the bottom plane of the housing 2. The bottom plane 19a is designed so as to be slanted by a desired grade with respect to the horizontal plane. The bearing member 18 has a threaded hole 21, the axis of which is parallel with the slanting bottom plane 19a of the channel 19 and in which the threaded portion 11a of the bolt 11 is screwed. The opposite portion 11b of the bolt 11 is rotatably mounted to the side wall of the housing 2 in a manner that the bolt is prevented from moving in the axial direction. Accordingly, when an operating knob 11c of the bolt 11 is rotated, the bearing member 18 together with the lever 16 shifts diagonally along the slanting bottom plane 19a of the channel 19, so that the proportion of the length L1 between the center of the pivot pin 20 and the axis of the push rod 7 and the length L2 between the center of the pivot pin 20 and axis of the valve member 10 changes, wherein the effective mechanical displacement of the push rod 7 is altered before it is applied to the valve member 10.

Figure 3:
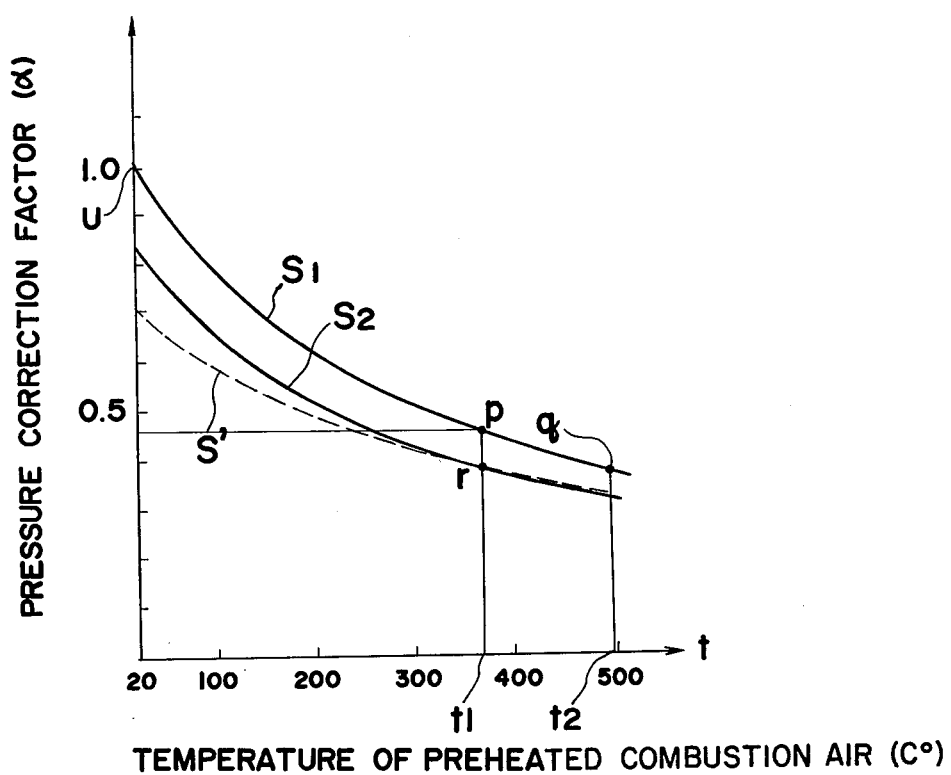
FIG. 3 is a graph showing characteristic curves relating to a relationship between the temperature of the preheated combustion air and the pressure correction factor.

FIG. 3 shows a graph of preferred characteristic curves S1 and S2 relating to air-fuel ratios. In FIG. 3, the abscissa represents the temperature of preheated combustion air and the ordinate represents a pressure correction factor $\alpha$ for correcting the pressure P1 of the working fluid supplied to the valve 8 so that fuel supply pressure control valve 31 can accomplish a favorable flow of the fuel in accordance with the temperature of the preheated combustion air to obtain the best air-fuel ratio. The pressure correction factor $\alpha$ defines the opening degree of the aperture 2a and is represented by the following formula.

$$\alpha = b(Ko/K)$$

wherein b : constant
As shown in FIG. 3, the characteristic curves S1 and S2 varies due to the parameter m, i.e., air-fuel ratio.

Assuming that the standard lowest air-fuel ratio is, for example 1.1, and the FIG. 1 shows the position of the lever 16 adjusted to control the valve member 10 so as to accomplish the standard lowest air-fuel ratio 1.1 under the standard temperature, for example, 20° C., before the combustion system begins working, the push rod 7, valve member 10 and lever 16 are respectively positioned as shown in FIG. 1, so that the aperture 2a is closed. When the temperature of the combustion air rises gradually, the expansible fluid in the temperature sensor 4 expands in accordance with the rising temperature and consequently the push rod 7 is mechanically displaced or depressed by the expanded fluid. As a result, the left end portion of the lever 16 is lowered by a certain stroke l1, which corresponds to the rising temperature of the preheated combustion air, while the right end portion of the lever 16 is elevated by a corresponding stroke l2 so that the valve member 10 comes to open the aperture 2a in accordance with the rising temperature of the combustion air to correct the pressure of the working fluid from P1 to P2 to be supplied to the fuel supply pressure control valve.

As shown in FIG. 3, if the temperature of the preheated combustion air rises, for example, from 20° C. to t1° C., the pressure correction factor α reduces from "u" to "p."

In the meanwhile, the proportion of l1:l2 corresponds to the coefficient "b" of the general formula which represents these characteristic curves S1 and S2, as described above. The proportion of l1:l2 is defined by a proportion of L1:L2. The proportion of L1:L2 is defined by the position of the lever 16 or pivot 20 which is shifted by the lever adjustment device 22. Assuming that the air-fuel ratio control apparatus is now working under the condition that the air-fuel ratio to be accomplished is 1.1 and the temperature of preheated combustion air is t1° C. (see FIG. 3), and that the air-fuel ratio is desired to change from 1.1 to, for example 1.2, the bolt 11 is rotated by a desired degree to slide diagonally upwards the bearing member 18 together with the lever 16. The upwards shift of the lever 16 means the relative change of the stroke of the rod 7 with respect to the lever 16. Referring to FIG. 3, reference symbols p and q respectively represent pressure correction factor α at the temperature of preheated combustion air t1° C. and t2° C. under the operating condition of air-fuel 1.1 and, a reference symbol r represents a pressure correction factor α at the temperature of preheated combustion air t1° C. which is the same value as that of the reference symbol q. Accordingly the changing length of the stroke of the rod 7 corresponds to the difference between the pressure correction factors p and q. If the lever 16 would be shifted only in an upward direction but not in a diagonal direction, the proportion of L1:L2 would not change and the characteristic curve would result in the one as depicted by a dotted curve S' which is depicted when the characteristic curve S1 is shifted in a left direction along the abscissa, when viewed in FIG. 3, by the difference between the temperature t1 and t2. The dotted curve S' does not correspond with the characteristic curve S2 to be accomplished. The diagonal shift of the lever 16 means the modification of the dotted curve S' to the characteristic curve S2, in other words, the change of the proportion of L1:L2 which defines the coefficient "b" of the characteristic curves S1 and S2. Accordingly, the change from the curve S1 to the curve S2 is completely accomplished only by the rotation of the bolt 11.

Figure 4:
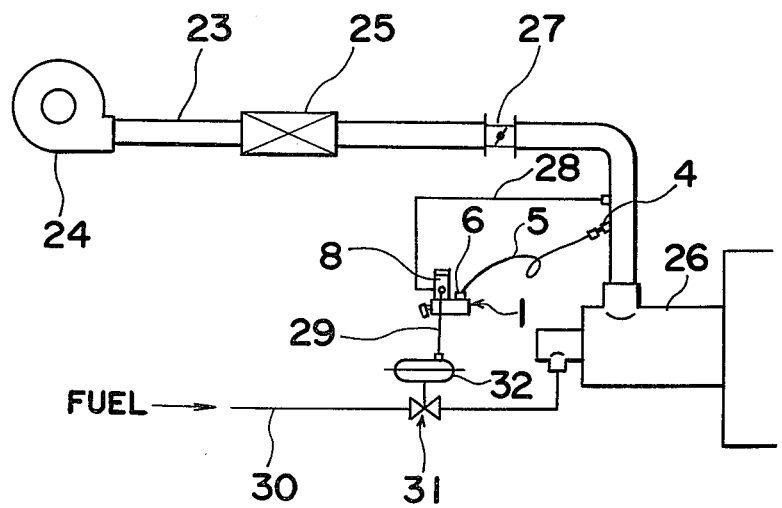
FIGS. 4 and 5 are schematic diagrams of the combustion system to which the air-fuel ratio control apparatus according to the present invention may be applied.
Figure 5:
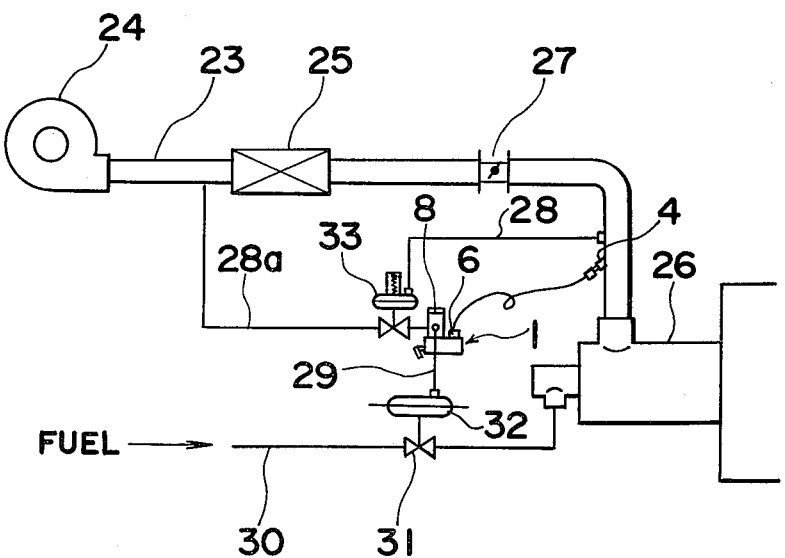

The automatic air-fuel ratio control apparatus 1 as described above can be applied to the combustion systems which are respectively shown in Figs. 4 and 5. In the embodiment shown in FIG. 4, the preheated combustion air is used as the working fluid to be led to the valve 8. The combustion air is supplied to a burner 26 by a blower 24 under a predetermined pressure through a conduit 23 in which heat exchanger 25 and combustion air flow control valve 27 are incorporated at each desired position, while the fuel, for example fuel gas, is supplied from a fuel supply device (not shown) to the burner 26 through a conduit 30 in which a fuel pressure control valve 31 is incorporated. One end of a bypass 28 is connected to a downstream portion of the conduit 23 with respect to the valve 27, while the opposite end of the bypass 28 is connected to the inlet 14 of the valve 8. The outlet 15 of the valve 8 is connected to a working chamber 32 of the fuel pressure control valve 31 through a conduit 29. The temperature sensor 4 is also inserted in a downstream portion of the conduit 23 with respect to the valve 27.

Under the above construction of the combustion system, the preheated combustion air is partially used as the working fluid to be led to the valve 8. Accordingly, the working fluid has a pressure which corresponds with that of combustion air controlled by the valve 27. The pressure of the working fluid is corrected by the air-fuel ratio control apparatus 1 so that the pressure control valve 31 precisely controls the pressure of the fuel to be supplied to the burner 26 to accomplish a desired air-fuel ratio.

In the embodiment shown in FIG. 4, it is necessary to use an expensive heat resistant material for the valve 8 since the preheated combustion air is used as the working fluid. In order to avoid such a problem, the embodiment shown in FIG. 5 may be employed.

In the embodiment shown in FIG. 5, there is provided a pilot valve 33. One end of the bypass 28 is connected to a downstream portion of the conduit 23 with respect to the flow control valve 27, while the other end of the bypass 28 is connected to a working chamber of the pilot valve 33. One end of the other bypass 28a is connected to upstream portion of the conduit 23 with respect to the heat exchanger 25, while the other end of the bypass 28a is connected to the inlet of the pilot valve 33. And the outlet of the pilot valve 33 is connected to the inlet 14 of the valve 8. In this embodiment, the combustion air at normal temperature, which is supplied to the valve 8 through the bypass 28a, is used as the working fluid. The pressure of the working fluid is corrected in the pilot valve 33 by the pressure of the preheated combustion air led to the working chamber so that it corresponds with the pressure of the preheated combustion air. Accordingly, the working fluid at a normal temperature may flow through the valve 8. As a result, the valve 8 can be made of a normal material such as bronze.

As is clear from the foregoing description, according to the present invention, flow of fuel is precisely controlled by a simple rocking motion of the rocking lever in accordance with the temperature of preheated combustion air so as to keep a desired air-fuel ratio and, the air-fuel ratio can be readily changed by a simple operation of shifting the rocking lever in a diagonal direction with respect to the push rod of the lever driving device and the valve member of the pressure correcting valve. Accordingly there can be provided an automatic air-fuel ratio control apparatus which is stable in functioning, has a high reliability, and readily incorporated into the combustion systems at low cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An automatic air-fuel ratio control apparatus for use in a combustion system of a type in which combustion air is preheated, which comprises a housing for accommodating a rocking lever, a lever driving means for moving said rocking lever in accordance with a temperature of the preheated combustion air, a pressure control valve which is driven by said rocking lever in such a manner that said valve corrects the pressure of a working fluid for controlling the flow of fuel to obtain a desired air-fuel ratio and, an adjustment means for adjusting a position of said rocking lever, said lever driving means having a push rod which is mounted on said housing in such a manner that it may protrude into said housing to push one end portion of said rocking lever in accordance with said temperature of the preheated combustion air, said pressure control valve having a valve member which is mounted on said housing in such a manner that it may be shifted by the opposite end portion of said rocking lever so that the pressure of said working fluid can be corrected, said adjustment means having a plane slanting with respect to a perpendicular plane to a shifting direction of said push rod and said pressure control valve and a bearing member including a pivot means for pivotally supporting said rocking lever in said bearing member, said bearing member slidably positioned on said slanting plane so that the relative protruding stroke of said push rod with respect to said one end portion of said lever may be changed and the proportion of a length between the axis of said push rod and the pivot means and a length between the axis of said valve member and said pivot means may also be changed according to a desired air-fuel ratio.

2. An automatic air-fuel ratio control apparatus as claimed in claim 1, wherein the lever driving means further includes a temperature sensor to be mounted in a preheated combustion supply conduit, a working member including said push rod and a conduit for connecting said temperature sensor and said working member, expansible fluid being contained in said temperature sensor, said conduit and said working member, whereby said push rod may protrude into said housing by expansion of the expansible fluid in accordance with the temperature of the preheated combustion air.

3. An automatic air-fuel ratio control apparatus as claimed in claim 1, further including an aperture for permitting the working fluid to partially flow out of said pressure control valve to correct the pressure of the working fluid supplied to said pressure control valve.

4. An automatic air-fuel ratio control apparatus as claimed in claim 1, wherein said bearing member of said adjustment means has a threaded hole, the axis of which is parallel to said slanting plane and said adjustment means further includes a bolt, the threaded end portion of which is screwed into said threaded hole of the bearing member and the opposite end portion of which is rotatably mounted on a wall of said housing, whereby said bearing member may slide along said slanting plane by rotating said bolt.

5. An improved combustion mixture control apparatus for regulating the delivery of air and fuel, in a predetermined ratio, to a combustion chamber comprising:
   control means for varying the flow of fuel to the combustion chamber;
   monitor means for monitoring the temperature of the combustion air being delivered to the combustion chamber and producing a correlated mechanical displacement to a displaceable member that moves in dependence on the temperature measured;
   means, connected to respectively the displaceable member of the monitor means and to the control means, for varying the control means in response to movement of the displaceable member; and
   adjustment means for selectively varying the effective mechanical displacement of the displaceable member to change the applicable air-fuel ratio, including a pivotable lever member, a bearing member having a pivot point for pivotably supporting the lever member and a support member having a slanting surface that displaces the pivot point relative to the displaceable member and the control means when the bearing member is moved relative to the support member, with the displaceable member positioned to exert force at generally one end of the pivotable lever member and the control means being responsive to movement of generally the other end of the pivotable lever member.

6. In a combustion mixture control apparatus operatively connected to a source of preheated combustion air and a source of fuel, control means for controlling the rate of flow of fuel, the air and fuel being delivered to a combustion chamber and the ratio of fuel to air being varied to optimize the combustion condition by varying the fuel delivery rate in response to temperature variations of the preheated combustion air, the improvement comprising:
   monitor means for monitoring the temperature of the combustion air being delivered to the combustion chamber including a temperature sensor and a working member that is physically displaced in direct correlation to the temperature measured by the sensor, and
   control means varying means, connected to respectively the monitor means and the control means, for varying the control means in response to the measured temperature, including a mechanical linkage member and a bearing member having a support means for movably supporting the linkage member, with the bearing member movably mounted relative to the working member to provide a predetermined variance of the effective mechanical displacement of the working member relative to the linkage member to provide a change in the air-fuel ratio;
   a base member having a support surface slanted to a horizontal plane; and
   adjusting means for moving the bearing member along the slanted support surface, such that the position of the pivot point contained on the bearing member is displaced relative to the working member and the control means.

* * * * *